(12) United States Patent
Yang et al.

(10) Patent No.: US 6,842,480 B1
(45) Date of Patent: Jan. 11, 2005

(54) PROGRAMMABLE MATCHED FILTER BANK

(75) Inventors: Gang Yang, Eatontown, NJ (US); Don Li, Morganville, NJ (US)

(73) Assignee: Golden Bridge Technology Incorporated, West Long Branch, NJ (US)

( * ) Notice: Subject to any disclaimer, the term of this patent is extended or adjusted under 35 U.S.C. 154(b) by 947 days.

(21) Appl. No.: 09/662,148

(22) Filed: Sep. 14, 2000

Related U.S. Application Data

(60) Provisional application No. 60/185,414, filed on Feb. 28, 2000.

(51) Int. Cl.$^7$ ................................................ H04B 1/69
(52) U.S. Cl. ........................ 375/152; 375/143; 375/343
(58) Field of Search ................................. 375/130, 134, 375/136, 137, 139, 140, 142, 143, 145, 147, 149, 150, 152, 350, 367, 368, 343; 708/314

(56) References Cited

U.S. PATENT DOCUMENTS

| | | | |
|---|---|---|---|
| 5,802,102 A | 9/1998 | Davidovici | |
| 5,862,133 A | 1/1999 | Schilling | |
| 5,933,447 A | 8/1999 | Tran et al. | |
| 5,936,369 A | 8/1999 | Iwashita et al. | |
| 6,061,359 A | 5/2000 | Schilling et al. | |
| 6,714,586 B2 * | 3/2004 | Yang et al. | ................. 375/148 |

* cited by examiner

*Primary Examiner*—Jean B. Corrielus
*Assistant Examiner*—Guillermo Muñoz
(74) *Attorney, Agent, or Firm*—McDermott Will & Emery LLP

(57) ABSTRACT

A programmable matched filter bank comprises a sliding integrator and compensation calculation circuits. The integrator receives a chip stream of samples derived from a received spread-spectrum signal and integrates a number of the most recent samples, to form a common integration value. Each of the compensation calculation circuits receives the same most recent samples and receives a respective one of the possible reference spreading code sequences. In operation, each compensation calculation circuit derives a compensation value, and an associated circuit modifies the common integration value by the respective compensation value. The result is a value of correlation between the predetermined number of most recent samples, for each respective reference code sequence. The inventive approach reduces the number of bit adders and inverters in the implementation of a matched-filter, a programmable matched filter and a programmable matched filter bank for spread spectrum receivers.

37 Claims, 10 Drawing Sheets

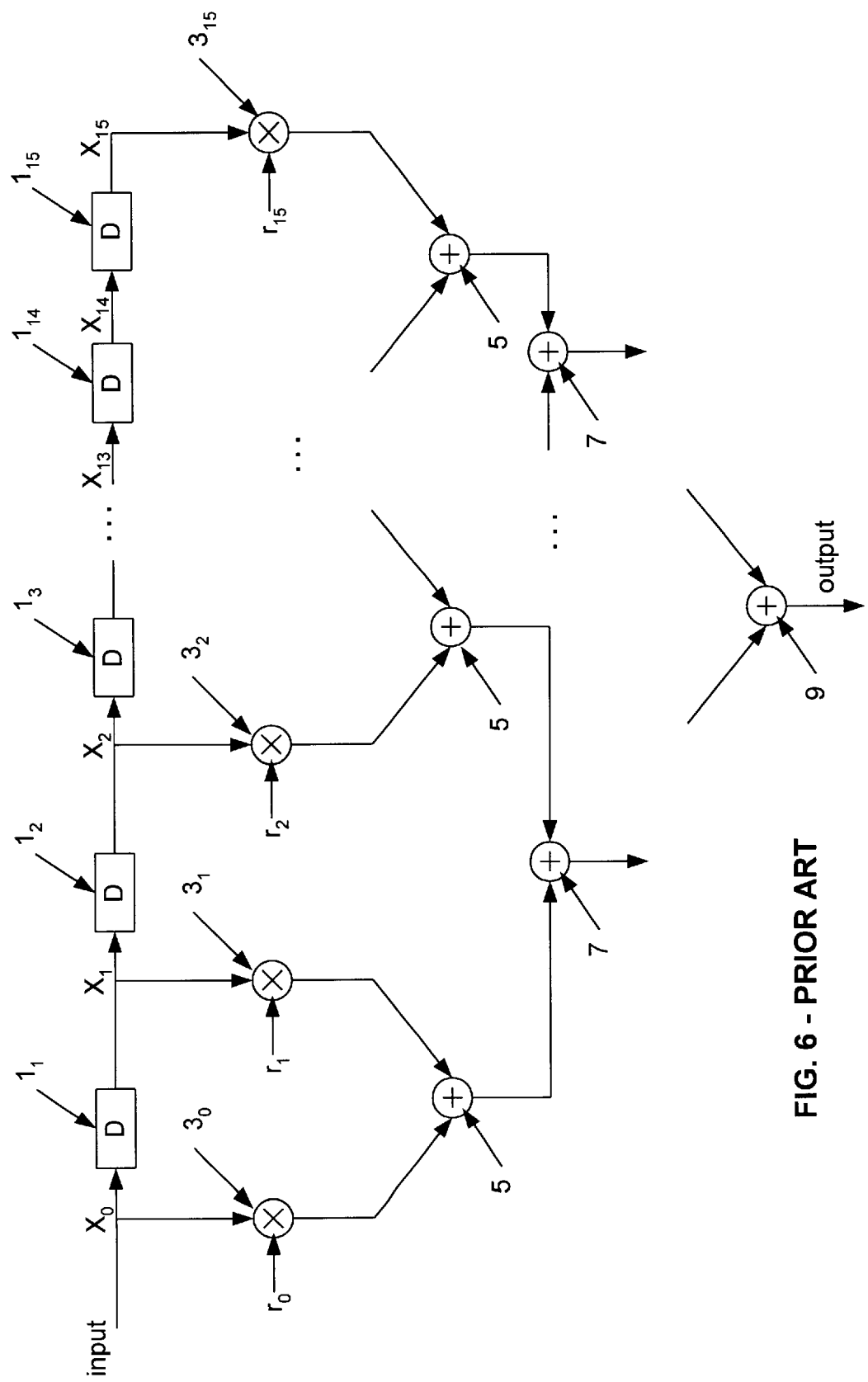
FIG. 6 - PRIOR ART

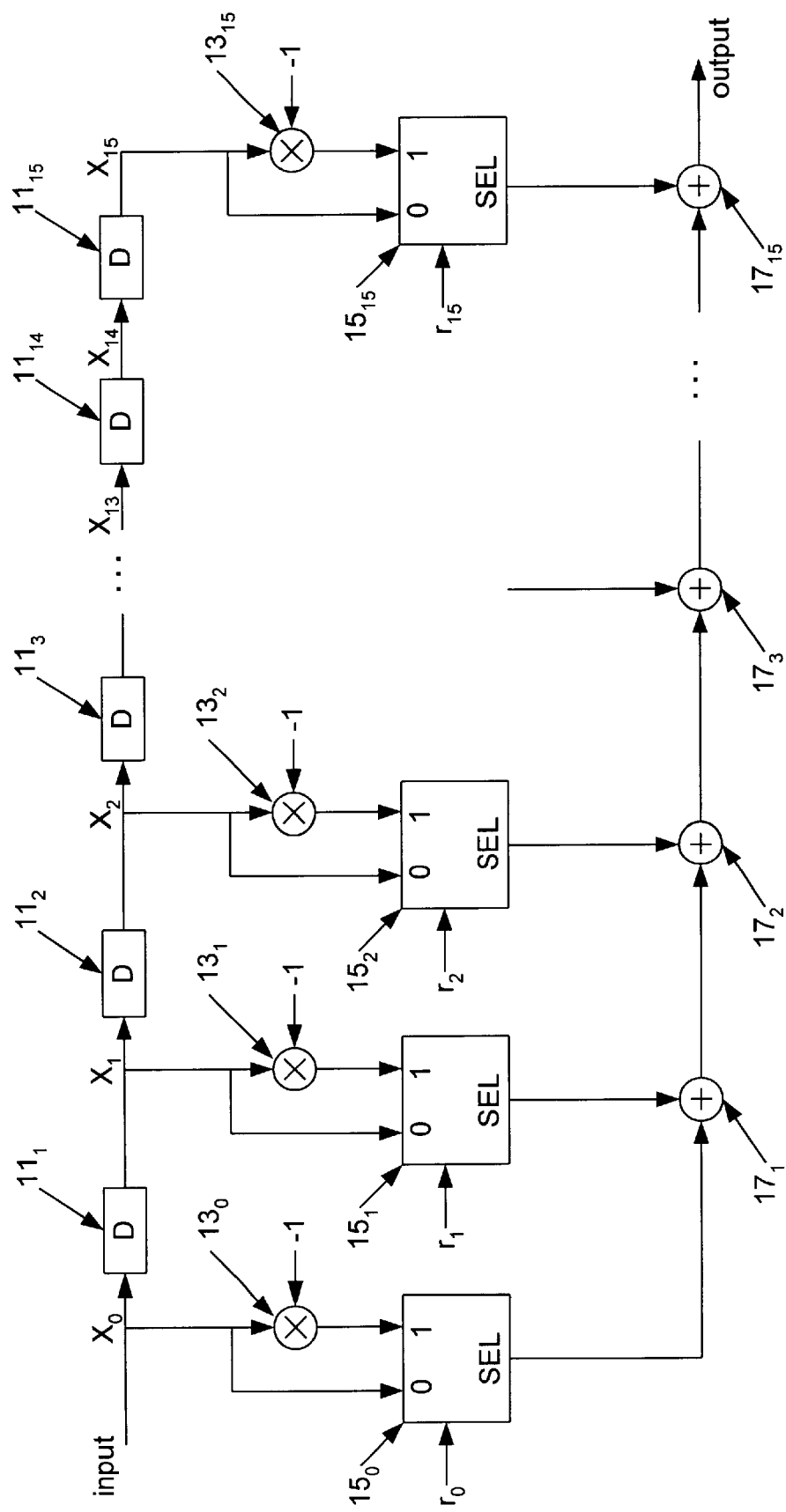
FIG. 7 - PRIOR ART

US 6,842,480 B1

PROGRAMMABLE MATCHED FILTER BANK

RELATED APPLICATION

This application claims the benefit of U.S. Provisional Application No. 60/185,414, entitled "PROGRAMMABLE MATACHED FILTER BANK" filed on Feb. 28, 2000, the disclosure of which is entirely incorporated herein by reference.

FIELD OF THE INVENTION

The concepts involved in the present invention relate to a more efficient designs for a programmable matched filter and a programmable matched filter bank, as well as to application of the filter and/or the bank to code recognition functions in direct sequence spread spectrum communications.

BACKGROUND

Mobile communication is becoming increasingly popular. The recent revolution in digital processing has enabled a rapid migration of mobile wireless services from analog communications to digital communications. For example, cellular service providers have already deployed substantial digital wireless communication infrastructure, much of which utilizes code division, multiple access (CDMA) technology. Increasingly, development efforts are focusing on techniques for high-capacity communication of digital information over wireless links, and much of this broadband wireless development work incorporates spread-spectrum communications similar to those used in CDMA.

Spread-spectrum is a method of modulation, like FM, that spreads a data signal for transmission over a bandwidth, which substantially exceeds the data transfer rate. Direct sequence spread-spectrum involves modulating a data signal onto a pseudo-random chip sequence. The chip sequence is the spreading code sequence, for spreading the data over a broad band of the spectrum. The spread-spectrum signal is transmitted as a radio wave over a communications media to the receiver. The receiver despreads the signal to recover the information data.

The attractive properties of these systems include resistance to multipath fading, soft handoffs between base stations and interference resistance. In addition, in a multipath environment, the use of Rake receivers enables the harnessing of the total received energy.

Receiving the direct sequence spread spectrum communications requires detection of one or more spreading chip-code sequences embedded in an incoming spread-spectrum signal as well as subsequent synchronization of the receiver to the detected chip-code sequence. Initial detection and phase synchronization of the spreading chip-code sequence (s) in the receiver is commonly known as code acquisition. Although simple correlators have been used in the code acquisition for reception of spread-spectrum signals, faster and more efficient techniques for code acquisition rely on matched filters.

A matched filter essentially matches elements or samples of an input signal to elements of a reference chip-code sequence signal, by multiplying a set of N samples of the input signal with a corresponding number of values of the reference signal, then summing the product terms to determine a value of correlation of the set of samples of the input signal to the reference signal. For a single code sequence, if the correlation value exceeds a threshold, then a decision circuit indicates that there is a match. If there are a plurality of spreading codes that may be used in the communication system, the receiver typically uses a bank of matched filters for parallel matching to a corresponding plurality of reference codes. If the receiver expects to receive only one transmission at a time, the decision processor selects the reference code having the highest correlation to the input samples as the match to the code contained in the received spread-spectrum signal. In many applications, the matching operations indicate how many possible spreading code sequences are received in a given symbol interval.

FIG. 6 is a simplified diagram of a matched filter. Specifically, the block diagram shows a layered matched filter structure. For purposes of this example, assume that the spreading code sequence and the corresponding reference are each 16-chips long. The matched filter therefore is scaled to match sixteen input samples to the 16-chip reference code. The input signal is initially applied to a multi-tap delay line formed of a series of fifteen delay devices 1. The matched filter comprises a plurality of multipliers 3. The filter includes one such multiplier $3_0$ to $3_{15}$ for receiving each of the input chip sequences from the input and the fifteen taps between and after the delays $1_1$ to $1_{15}$ of the delay line.

Assume for discussion purposes that each reference code comprises a sequence $T_0, T_1 \ldots r_{15}$. Each multiplier 3 receives a portion $r_i$ of reference code of the particular sequence for multiplication with the respective current or delayed portion $X_i$ of the input chip stream. Thus, the multiplier $3_0$ receives the $r_0$ value of the reference code and multiplies it by the $X_0$ sample of the input (i.e. the current sample). Similarly, the multiplier $3_1$ receives the $r_1$ value of the reference code and multiplies it by the $X_1$ sample of the input (i.e. the sample from the previous time interval delayed by the device $1_1$); and so on until the multiplier $3_{15}$ receives the $r_{15}$ value of the reference code and multiplies it by the $X_{15}$ sample of the delayed input as received from the delay device $1_{15}$.

Assuming that a code chip may have a value of 1 or −1 (corresponding to 0, 1 in digital/binary notation), each multiplication operation will have an output value of 1 if the input value and the reference value are the same (1×1 or −1×−1). Each multiplication operation will have an output value of −1 if the input value and the reference value are different (1×−1 or −1×1).

To determine an overall correlation to the complete reference code sequence, the outputs of the multipliers $3_0$ to $3_{15}$ are summed in pairs, through layers of adders 5, 7 and 9 arranged in a tree structure. The last adder 9 outputs the total correlation value, which represents how closely the input chip stream matched the reference code sequence. For a perfect match, for example, the output of the adder 9 would be equal to the number N of chips matched, that is to say 16 in the present example. If there were no match at all, the output of the adder 9 would be −16. However, in an implementation processing real received spread-spectrum signals, there will be some variable degree of matching.

FIG. 7 shows a modified form of a matched filter, which makes the device programmable. Again in a 16-chip example, the input signal is initially applied to a multi-tap delay line, in this case a line formed of a series of fifteen delay devices 11. The matched filter comprises sixteen multipliers $13_0$ to $13_{15}$, that is to say one for receiving each of the input chip samples $X_0$ to $X_{15}$ from the input and the taps between and after the delays $11_1$ to $11_{15}$ of the delay line. In this implementation, however, each multiplier 13 multiplies the respective sample from the input by a value of −1. In an actual circuit, a simple inverter circuit can implement each operation of multiplication by factor −1.

The programmable matched filter also comprises a plurality of selector circuits (SELs) 15. The filter includes one such selector (SEL) $15_0$ to $15_{15}$ for receiving each of the input chip samples $X_0$ to $X_{15}$ from the input and the taps of the delay line. Each selector 15 receives a respective sample $X_i$ on its 0 input port. A respective multiplier/inverter 13 supplies the inverse of that sample value or $-X_i$ to the 1 input port of the respective selector 15. In the programmable version of the matched filter, the reference code components $r_0, r_1 \ldots r_{15}$ are applied to respective control inputs of the selectors (SEL) $15_0$ to $15_{15}$. In the programmable device of FIG. 7, each combination of a multiplier/inverter 13 with a selector 15 essentially replaces one of the code multipliers 3 in the embodiment of FIG. 6.

Assuming again that a code chip may have a value of 1 or −1 (corresponding to 0, 1 in binary notation), each selector 15 outputs a value of 1 if the input value and the reference value are the same (1×1 or −1×1). Each selector 15 outputs a value of −1 if the input value and the reference value are different (1×−1 or −1×1).

To achieve this operation, each selector (SEL) $15_0$ to $15_{15}$ receives a portion ri of reference code of the particular sequence. In response, each selector outputs the current value of $X_i$ from the 0 input port or the current value $-X_i$ appearing at the 1 input port, based on the current value of the respective $r_i$ portion of the reference code sequence. More specifically, if the binary value of $r_i=1$, a selector 15 will supply the input from port 1 to its output, that is to say the inverse of the respective sample value $X_i$. Conversely, if the binary value of $r_i=0$, a selector 15 will supply the input from port 0 to its output, that is to say the actual respective value $X_i$. For example, the selector $15_0$ receives the $r_0$ value of the reference code and outputs the $X_0$ sample of the input if the $r_0$ value has a binary value of 0 signifying a positive (+1) input. The selector $15_0$ outputs the $-X_0$ sample of the input if the $r_0$ value has a binary value of 1 signifying a negative (−1) input.

Consequently, if the reference binary value is $r_i=0$ (signal level of +1), the selector outputs a +1 if the input signal $X_i=1$ and thereby matches the reference. Similarly, if the binary reference value is $r_i=1$, the selector outputs a +1 taken from the $-X_i$ input, when the input signal $X_i=-1$ and thereby matches the reference. Conversely, the selector outputs a −1 when the binary value of $r_i=0$ (signal level of +1) and the input signal of $X_i=-1$. The selector similarly outputs a −1 when the binary value of $r_i=1$ (representing a signal level of −1) and the input signal $X_i=1$.

To determine an overall correlation of the set of samples to the complete set of values of the reference code sequence, the outputs of the selectors 15 are summed, in this case through a series of adders $17_1$ to $17_{15}$. The last adder $17_{15}$ outputs the total correlation value, which represents how closely the input chip stream matched the current reference sequence r, essentially as in the embodiment of FIG. 6. The use of the selectors 15, however, makes the matched filter of FIG. 7 programmable, in that it is a simple matter to reprogram the filter by changing the $r_i$ values of the binary sequence appearing on the control inputs of the selector circuits 15.

The receiver circuitry, including that of the matched filters may be implemented in the form of a programmable digital signal processor, but more often is implemented in an application specific integrated circuit (ASIC) chip. Each inversion and each addition requires a processor operation or more likely a circuit module within the ASIC. Each inverter or adder increases the complexity of design and manufacture of the chip. Also, each inverter or adder consumes space on the actual chip and requires additional power, both of which are scarce resources, particularly in a mobile wireless receiver.

There is an ongoing need to improve the efficiency of the receiver circuitry, including that of the matched filter(s). The need is multiplied when multiple filters are used in a bank for processing code sequences in parallel. The problems also grow as the filter design expands to handle longer code sequences. Hence there is a clear need for a technique to simplify the structure and operation of a programmable matched filter, particularly one used to implement the matched filter bank in a mobile spread-spectrum receiver.

SUMMARY OF THE INVENTION

Hence a general objective of the invention is to reduce the complexity of a programmable matched filter and/or a programmable matched filter bank.

Another objective relates to reducing the number of computations and/or the number of circuits needed to implement a programmable matched filter or matched filter bank, for use in a spread spectrum receiver.

A further objective is to improve the efficiency in code processing for a spread spectrum receiver.

The inventive concepts alleviate the above noted problems in spread-spectrum communications and achieve the stated objectives by using a programmable matched filter design or filter bank based on the recognition that a matching of an input to a sequence of all-zero binary values actually can be performed by a simple integrator. The filter then determines correlation to an actual reference code by calculating a compensation value, which value for example may correspond to a transform between the all-zero sequence and the reference code. In a matched filter bank utilizing the invention, the integrator actually is a shared common element. Separate compensation values are determined for a plurality of reference codes that may appear as spreading codes in the particular communication system. The respective compensation values are then used to modify the common integration value to derive respective correlation values.

Hence, a first aspect of the invention relates to a programmable matched filter. This filter comprises an integrator responsive to a chip stream of samples from the received spread-spectrum signal. This first element integrates a predetermined number of most recent samples from the chip stream, to obtain an integration value. The programmable matched filter also includes programmable control gates, preferably implemented in modules or blocks of selectors. Each individual control gate receives a respective one of the samples at an input port and receives a respective value of the reference code sequence at a control port. The preferred embodiment uses selectors and applies a null value to second input ports of the selectors. Each gate outputs a value of a respective sample, if the received reference value bears a specific relationship to the identity value (binary 1), indicating a need for compensation in relation to that component of the reference.

In one preferred embodiment, the selector outputs the respective sample if the current value on its control port is an identity value, whereas the selector outputs the null value if the current value on its control port is not identity (binary 0). In a second preferred embodiment, the selector outputs the respective sample if the current value on its control port is not identity, whereas the selector outputs the null value if the current value on its control port is the identity value.

At least one adder sums the values from the control gates, to form a compensation value. The compensation value is preferably multiplied by a factor of 2 and used to modify the integration value, to obtain a value relating to correlation of the input to the reference sequence. If each the selector outputs the respective sample if the current value on its control port is identity (first embodiment), the compensation value is subtracted from the integration value, to obtain the correlation value. If each the selector outputs the respective sample if the current value on its control port is not identity (second embodiment), the compensation value is added to the integration value, to obtain the correlation value.

Alternative aspects of the invention utilize hard-wired connections in place of the programmable selectors. The hard-wired connections effectively serve to implement a fixed selection of the input samples corresponding to a non-varying or fixed reference code sequence.

Another aspect of the invention relates to a programmable matched filter bank comprising an integrator and compensation calculation circuits. The integrator preferably is a shared common element, that is to say there is only one integrator needed in the entire bank, even though the bank may process many code sequences. The integrator receives a chip stream of samples derived from the received spread-spectrum signal and integrates a number of the most recent samples, to form a common integration value. Each of the compensation calculation circuits receives the most recent samples and receives a respective one of the possible spreading code sequences. In operation, each compensation calculation circuit derives a compensation value, and a correlation calculation circuit modifies the common integration value by the respective compensation value. The result is a value of correlation between the predetermined number of most recent samples for each respective reference code sequence. The inventive programmable matched filter bank utilizes a reduced number of adders and inverters and is particularly useful in a burst-mode, high-speed spread spectrum receiver.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

FIG. 6 is a functional block diagram of a prior art matched filter.

FIG. 7 is a functional block diagram of a prior art programmable matched filter.

DETAILED DESCRIPTION OF THE PRESENTLY PREFERRED EMBODIMENTS

In a matched filter, if the reference code consists of an all-zero sequence (a series of all binary 0 values, i.e. in decimal term all +1 values), the matching would involve multiplication of the input samples (a sequence of +1s and −1s) by the reference sequence of +1s. Each such multiplication would pass through the respective input sample value. The correlation value then would be the sum of the input samples over the appropriate number of sample intervals. A circuit for implementing this operation essentially becomes a simple signal integrator, for integrating the input signal over a moving or sliding time window comprising the most recent N sample intervals. A preferred embodiment of such an integrator, for example, might integrate the difference between the newest sample and the old sample for the interval preceding the N most recent intervals.

In a real application, for example to recognize a code in a received spread-spectrum signal, each reference code sequence differs from the all-zero sequence for at least some of the values in the sequence. However, it is possible to transform any known reference code sequence into an all-zero sequence. If the transform is known, it is then possible to match the input to the all-zero code sequence using the integrator and modify the resulting correlation value essentially to compensate for the transformation of the reference sequence.

The present invention forms a programmable matched filter comprising a circuit for integrating the input samples over a predetermined number of the most recent sample intervals with a system for determining a compensation corresponding to the transform between an actual reference code sequence and an all-zero code sequence. The result of the integration is modified by a value from the determination of the compensation, to produce the actual correlation value related to the degree of matching between the input and the actual spreading code sequence.

In a bank of matched filters, the signal integration actually can be a common function performed by a single circuit. The results relating to different possible reference codes are derived by different compensations corresponding to the conversion between the respective actual sequences used in the spread spectrum communication system and the all-zero sequence.

Figure 1:
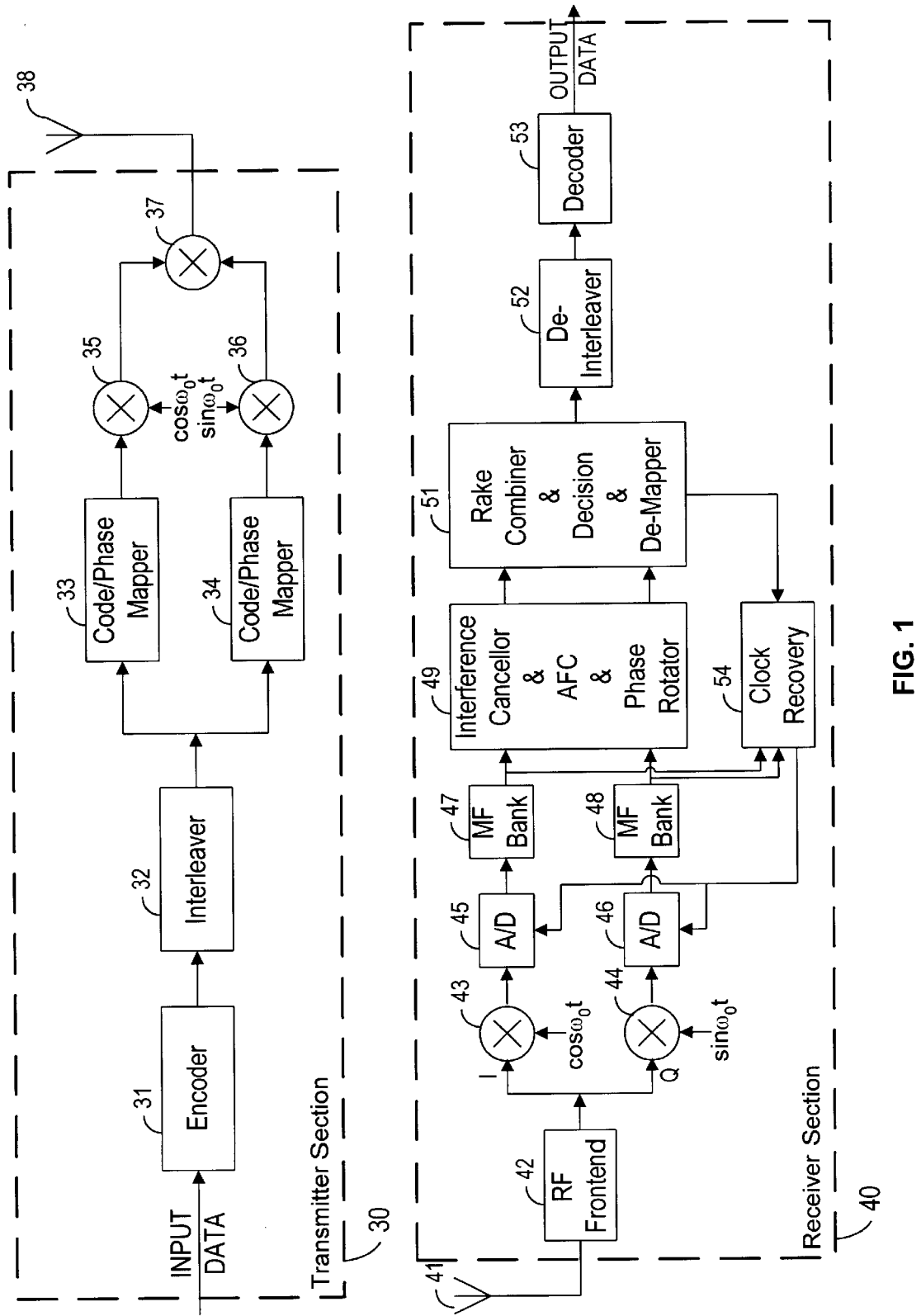
FIG. 1 is a functional block diagram of a spread-spectrum communication system, including a transmitter and a receiver, wherein the receiver may implement the programmable matched filter bank in accord with the invention.

The inventive programmable matched filter bank is particularly useful in a burst-mode, high-speed spread spectrum receiver. Accordingly, it may be helpful at this point to summarize the structure and operation of an exemplary spread spectrum communication system in general and the receiver in such a system in particular. FIG. 1 depicts a direct-sequence spread spectrum communication system, using burst mode time-division access and providing high-speed service. The illustrated system includes a transmitter 30 communicating with a receiver 40 via an air-link.

The transmitter section 30 essentially includes the elements 31–38 shown in the drawing. In the transmitter 30, an encoder 31 receives input information data, for example at 28 Mbps. The encoder 31 performs error correction encoding, for example by application of a rate-½ convolutional code. The resultant encoded data at 56 Mbps is applied to an interleaver 32. At the output of the interleaver 32, the data stream is divided into a number of sub-channel data streams, by a demultiplexer (not shown). In this example, the data stream is split into two branches, one for an in-phase (I) channel and one for the quadrature (Q) channel.

Each sub-channel data sequence goes to an input of one of two code mapper circuits 33, 34. Each code mapper maps bits of input data to a distinct one of the available code-spreading sequences. The mappers 33, 34 may also map certain bits of input data to adjust the phase of the selected code-spreading sequences, but for purposes of discussion here, it is assumed that the mappers perform only the code map function. A modulator 35 receives the code-spread output of the I-channel mapper 33. The modulator 35 multiplies the direct sequence spread spectrum signal by an RF oscillator signal $\cos(\omega_o t)$. Similarly, a modulator 36 receives the code-spread output of the Q-channel mapper 34. The modulator 36 multiplies the direct sequence spread spectrum signal by an RF oscillator signal $\sin(\omega_o t)$. The two resultant modulated signals have the same frequency ($\omega_o t$) but have a 90° phase difference. A summer 37 combines the two modulated RF signals from the modulators 35 and 36, and the combined signal is transmitted over the channel from the transmit antenna 38.

The receiver 40 essentially comprises the elements 41–53. The receiver 40 includes an antenna 41 for receiving the spread-spectrum signal transmitted over the air-link. An RF frontend system 42 provides low noise amplification and automatic gain control (AGC) processing of the analog signal from the antenna 41. The RF frontend system 42 supplies the channel signal to two translating devices 43 and 44. A local oscillator generates proper carrier-frequency signals and supplies a $\cos(\omega_o t)$ signal to the device 43 and supplies a $\sin(\omega_o t)$ signal to the device 44. The translating device 43 multiplies the amplified over-the-air channel signal by the $\cos(\omega_o t)$ signal; and the translating device 44 multiplies the amplified over-the-air channel signal by the $\sin(\omega_o t)$ signal. The translating devices 43 and 44 translate the received multi-channel spread-spectrum signal from the carrier frequency to a processing frequency.

The translating device 43 downconverts the spread-spectrum signal to the processing frequency and supplies the converted signal to an analog to digital (A/D) converter 45. Similarly, the translating device 44 downconverts the spread-spectrum signal to the processing frequency and supplies the converted signal to an analog to digital (A/D) converter 46. Each of the digital output signals is applied to a matched filter (MF) bank 47 or 48. Each matched filter bank 47, 48 utilizes a matrix of potential spreading codes as reference signals, for example to recognize any one or more of sixteen possible spreading codes, and correlate the signal on its input to identify the most likely matches. In this manner, each MF filter bank 47 or 48 selects the most probably transmitted code sequence for the respective channel.

The signals from the MF banks 47 and 48 are supplied in parallel to a processor 49, which performs interference cancellation, AFC and phase rotation, and the outputs thereof are processed through a Rake combiner and decision/demapper circuit 51, to recover and remap the chip sequence signals to the original data sequences. The data sequences for the I and Q channels also are multiplexed together to form a data stream at 56 Mbps. This detected data stream is applied to a deinterleaver 52. The deinterleaver 52 reverses the interleaving performed by element 32 at the transmitter. A decoder 53 performs forward error correction on the stream output from the deinterleaver 52, to correct errors caused by the communication over the air-link and thus recover the original input data stream (at 28 Mbps).

The illustrated receiver 40 also includes a clock recovery circuit 54, for controlling certain timing operations of the receiver 40, particularly the A/D conversions.

The present invention provides an improvement in the circuitry of the matched filter banks 47, 48 shown in the receiver 40 of FIG. 1. In accord with the invention, each of these banks includes a number of matched filters, as discussed in detail later, with respect to FIGS. 2 to 5.

In the above-discussed example of FIG. 1, for simplicity, there was essentially one transmitter sending to one receiver. The actual application of the invention may involve multicasting to multiple receivers. A preferred network, however, would include a number of cell-site base stations connected to a broadband packet network (not shown).

Each base station would include a transmitter and a receiver utilizing cell-site specific cover codes. A number of mobile stations would communicate with each base station. Within each cell, the mobile stations would access the air-link in a time division manner. In a similar fashion, the cell site base station would transmit to each mobile station on a time division basis. In any two-way communication network, all stations would include a transmitter and a receiver. For example, both the base stations and the mobile stations in the cellular network would include a transmitter 30 and a receiver 40, such as disclosed with regard to FIG. 1. In both directions, the receiver would utilize one or more matched filters implemented in accord with the present invention.

Those skilled in the art will recognize that the spread-spectrum communication system of FIG. 1 is but one example of a spread-spectrum system that may utilize a programmable matched filter or of a programmable matched filter bank, in accord with the invention. For example, the inventive filters are similarly applicable to code recognition in CDMA cellular receivers, in wideband CDMA receivers, etc.

Consider now the theory of matched filtering and transformation involved in the present invention. In a matched filter, if the reference code consists of an all-zero sequence (a series of all binary 0 values), the matching would involve multiplication of the input of +1s and −1s by the reference sequence of +1s. An implementation of such a matched-filtering operation could actually be reduced to adding in the most recent N samples (r(t) where t=0 to N−1). Such a moving-window integration involves keeping a running total of the samples, and as each new sample is available to add-in, subtracting out the oldest sample preceding the most recent N samples (that is to say subtracting out the r(N)

sample). A circuit to perform such an operation could be as simple as a signal integrator, for integrating the input signal over a moving time window comprising the most recent N sample intervals. Actual embodiments of the integration system disclosed below sum the difference between the newest sample and the sample preceding the N most recent samples, although the sign of the difference value varies between two of the embodiments depending on the desired subsequent compensation operation.

Figure 2A:
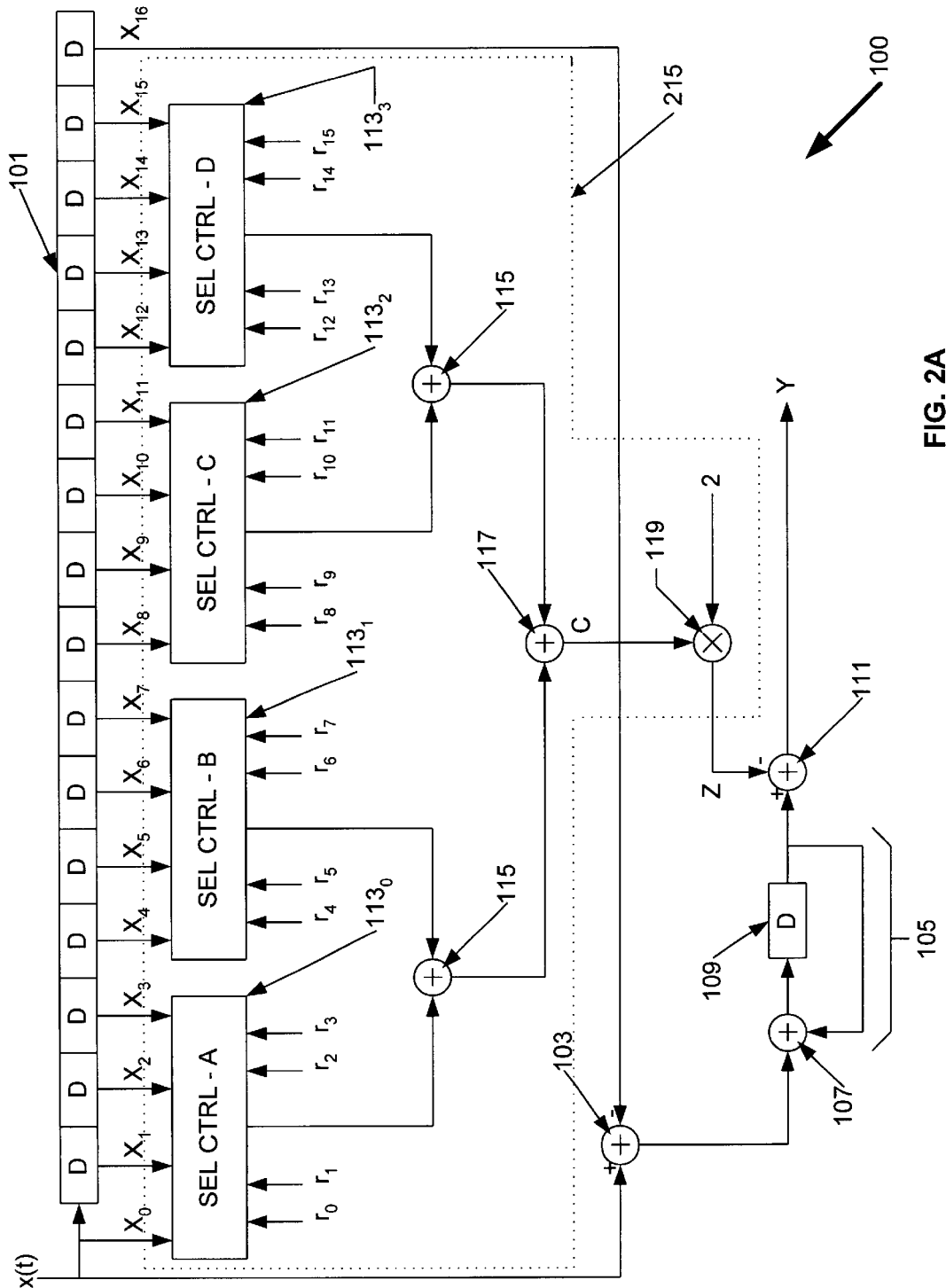
FIG. 2A is a functional block diagram of a programmable matched filter, in accord with an exemplary embodiment of the present invention.

FIG. 2A depicts an exemplary embodiment of a programmable matched filter 100, implemented in accord with the invention. Assume for purposes of discussion, that code sequences used in the spread-spectrum communication system are 16 chips long, although it should be readily apparent that the invention is easily adaptable to processing of codes of other lengths. In the example, the filter 100 includes a multi-tap delay line 101 comprising 16 delay devices, for example formed by a shift register of appropriate length. Each delay device delays the signal by a period corresponding to the chip interval or sample period used in the communication system. The input chip stream x(t) is applied to an input of the delay line 101.

The filter 100 also includes an N-sample integrator system, which encompasses the adder 103 and the actual integrator or summing loop 105 formed by another adder 107 and a delay device 109.

The first (+) input of the adder 103 connects to the input x(t). As such, this input receives the current value $X_0$ of the input at time t=0. The other input of the adder 103 receives a negative or inverse (−) of the oldest sample preceding the most recent N samples, that is to say of the $X_{16}$ sample in our 16-chip example. The drawing omits the actual inverter between the last tap of the delay line 101 and the second input to the adder 103, for simplicity of illustration. As a result of these connections, the inverter and the adder 103 essentially subtract the oldest sample preceding the most recent 16 samples, from the latest $X_0$ sample value.

The adder 103 supplies the result of this subtraction to the integration loop 105. The integration loop 105 comprises an adder 107, a delay device 109 and a feedback loop connected from the output of the delay device 109 to the second input of the adder 107. The device 109 provides a delay of one sample interval. The integration loop 105 essentially adds the difference between the $X_0$ value and the $X_{16}$ value to the total value calculated during the previous sample period as represented by the output of the delay device 109.

Each of the one-chip samples $X_0$ to $X_{16}$ from the input stream x(t) will have a numeric value, expressed in digital data format. In an ideal case, for example, the values would be +1 or −1. The bits of the reference $r_0$ to $r_{16}$ of the reference code sequence will have either an identify value or a non-identity value, represented by 1 and 0, respectively, in binary/digital notation.

As noted earlier, a real application to recognize a code in a received spread-spectrum signal must correlate with respect to a reference code sequence that may differ from the all-zero sequence. The delay device 109 therefore supplies the integration value to a positive input of an adder circuit 111. The circuit 111 has a negative or inverse input, which receives a compensation value Z (inverter not shown for simplicity of illustration) from a compensation calculation circuit 215. The Y output of the adder 111 represents the actual correlation value related to the degree of matching between the N-samples of the input x(t) and the actual spreading code sequence.

The current value of the input signal x(t) is $X_0$. The taps of the delay line 101 output 16 (N) delayed samples $X_1$ to $X_{16}$. In accord with the invention, subsets of the samples are applied to a series of selector control blocks 113 within the compensation calculation circuit 215. In the example, each block 113 receives a subset consisting of four of the input samples. Thus, selector control block A ($113_0$) receives the samples $X_0$ to $X_3$. The selector control block B ($113_1$) receives the samples $X_4$ to $X_7$. Similarly, the selector control block C ($113_2$) receives the samples $X_8$ to $X_{11}$; and the selector control block D ($113_3$) receives the samples $X_{12}$ to $X_{15}$.

In a spread-spectrum receiver, a reference code sequence r(i) would correspond to a spreading code utilized by the spread spectrum communication system. The sequence r(i) would take the form of a sequence of values. In our 16-chip example, the sequence can be represented by the series $r_0, r_1, r_2, \ldots r_{15}$. In the programmable matched filter 100, each selector control block 113 receives a subset of these values of the reference code sequence, specifically four values each, in the 16-chip example. Thus, selector control block A ($113_0$) receives the values $r_0$ to $r_3$. The selector control block B ($113_1$) receives the values $r_4$ to $r_7$. Similarly, the selector control block C ($113_2$) receives the values $r_8$ to $r_{11}$; and the selector control block D ($113_3$) receives the values $r_{12}$ to $r_{15}$.

The selector control blocks 113 preferably utilize programmable control gates, preferably in the form of selectors, to execute a gating function on the input samples. The blocks 113 preferably use adders to accumulate the values from the selected ones of the input samples. The specific selection and accumulation function is based on the subset of the reference code. In the illustrated embodiment, each selector block effectively gates specific sample values so that they pass through at positions in the input sequence that correspond to the identity values in the reference sequence.

Figure 3A:
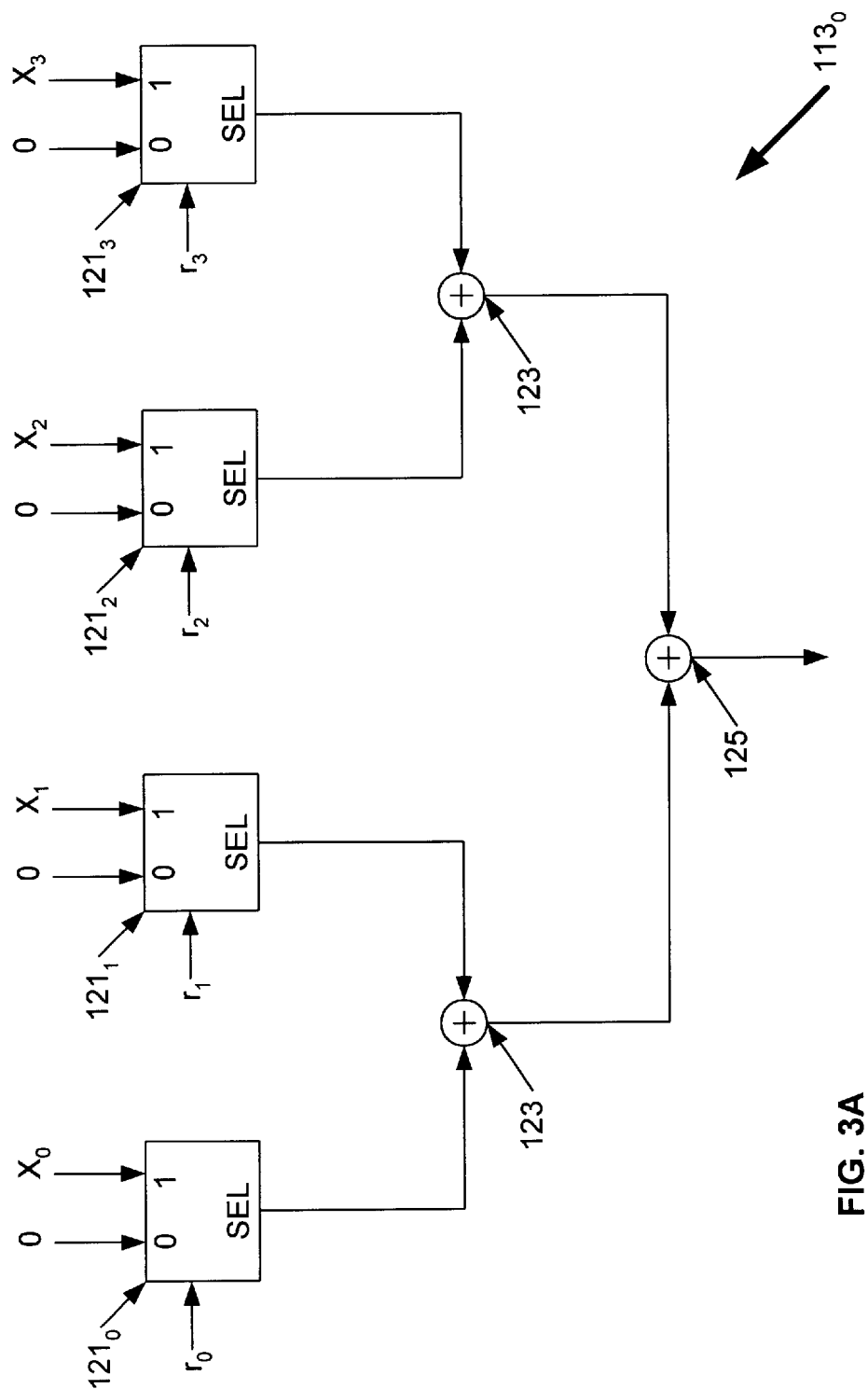
FIG. 3A is a functional block diagram of one of the selector blocks, used in the inventive programmable matched filter of FIG. 2A.

Each selector block sums such gated sample data, to form the respective data value. It may be helpful to consider the structure of one of the selector control blocks 113, as an example. FIG. 3A is a block diagram of the selector control block $113_0$. In the current example; where selector control block $113_0$ processes four input samples and four values from the reference sequence, the block comprises four selectors 121. The control gates could comprise gate circuits of various types. For example, each selector 121 could take the form of one or more logic gates responsive to $X_i$ and $r_i$ input values. Preferably each selector comprises a 1-output from 2-input selector, which is responsive to one control input. The selectors may also be responsive to a clock input (not shown), to control precise timing of each selection operation.

In the preferred implementation, each selector receives a null (0) value on its 0 input port. On its 1 input port, each selector 121 receives a respective sample value $X_i$, consisting of the +1 or −1 value at any given time. As a control input, each selector 121 receives one of the $r_i$ values of the reference sequence. For example, the selector $121_0$ receives the current input sample $X_0$ on its 1 input port and receives the $r_0$ value of the reference sequence on its control input. Similarly, the selector $121_1$ receives the input sample $X_1$ (delayed from the preceding sample interval) on its 1 input port and receives the $r_1$ value of the reference sequence on its control input. In like fashion, the selector $121_2$ receives the sample $X_2$ on its 1 input port and receives the $r_2$ value of the reference sequence on its control input, whereas the selector $121_3$ receives the sample $X_3$ on its 1 input port and receives the $r_3$ value of the reference sequence on its control input.

The $r_i$ reference values may have a binary 0 or 1 value. If a reference value is binary 0 (non-identity), the selector supplies the null value (0) from the 0 input port to the output of the respective selector 121. If the reference value is binary 1, the selector supplies the respective data value (+1 or −1) from the 1 input port to the output of the respective selector 121.

Adders 123 sum the outputs from pairs of the selectors 121. An adder 125 in turn sums the output values from the adders 123. The data value output by the adder 125 represents the sum of the sample values corresponding to the respective identity value reference components.

To appreciate the operation of the selector control circuit $113_0$, it may be helpful to consider a specific numerical example. First, if the reference values were actually all-zeros, each selector 121 would output a null (0) value. Such outputs would be summed, but the sum would still be 0, essentially meaning that no compensation is necessary since that portion of the reference was all 0s.

Now assume for discussion purposes, that the $r_0$ to $r_3$ portion of the reference sequence alternates between values, for example the $r_0$ to $r_3$ values are 0, 1, 0, 1. In such a case, the selector $121_0$ would output the null (0) value because the reference is a 0 value. However, the selector $121_1$ would output the +1 or −1 value of the $X_1$ sample. Similarly, the selector $121_2$ would output the null (0) value because the reference is a 0 value, whereas the selector $121_3$ would output the +1 or −1 value of the $X_3$ sample. The adders 123 and 125 would sum the four selector outputs, in this case to obtain the data value based on the total of the $X_1$ and $X_3$ samples.

The selector control block $113_0$ operates in a similar manner for other variations of the sequence of values of the reference to sum the sample values for those reference samples that are 1 instead of 0. The other selector control blocks $113_1$ to $113_3$ operate in the same fashion as the block $113_o$, to process the respective subsets of sample values and reference values, to produce appropriate data values.

Returning to FIG. 2A, the programmable matched filter 100 includes a pair of adders 115. Each of the adders 115 sums a pair of the data output values from two of the selector control blocks 113. An adder 117, in turn sums the values output by the adders 115, to form the first level compensation value C. The value C represents the sum of the samples at the current time, for those samples corresponding to identity values in a respective reference signal.

The filter 100 includes a doubler or multiplier 119. The multiplier 119 receives the total C value output by adder 117. As explained above, the C value was accumulated from data values output by the selector control blocks 113. The multiplier 119 multiplies the first level compensation value C by a factor of 2, to form the actual compensation value Z. The multiplier 119 supplies the value Z as an inverse or negative value to the adder 111 (inverter not shown). The adder effectively subtracts the Z value from the result of the integration of the input over the latest 16 sample intervals (from delay device 109), to produce the actual correlation value Y.

Figure 2B:
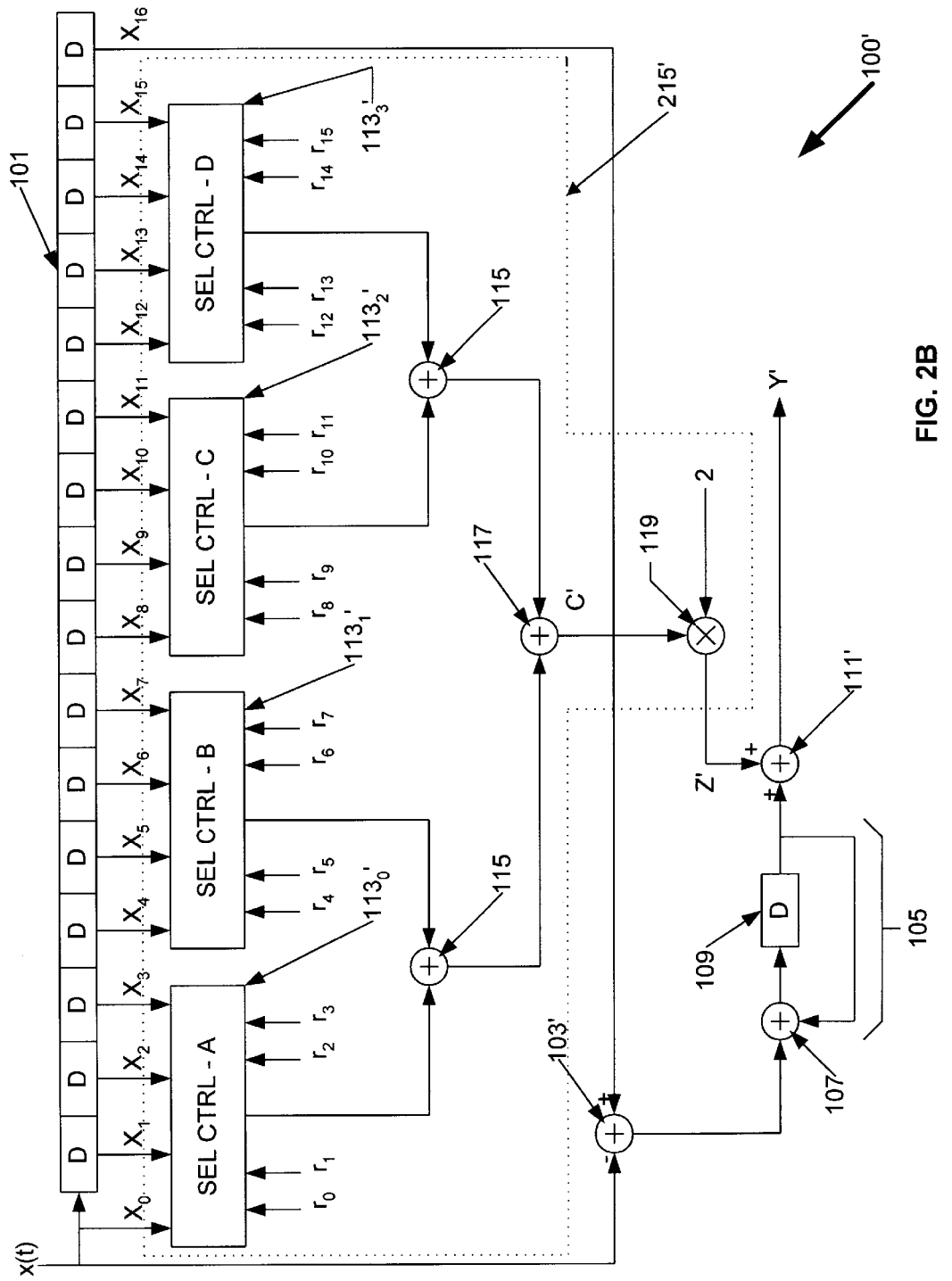
FIG. 2B is a functional block diagram of a programmable matched filter, in accord with an alternate embodiment of the present invention.

FIG. 2B shows the functional elements to the alternative embodiment 100' of the programmable matched filter. Assume again that code sequences used in the spread-spectrum communication system are 16 chips long, although it should be readily apparent that this embodiment also is easily adaptable to processing of codes of other lengths. The filter 100' includes a multi-tap delay line 101 comprising 16 delay devices, for example formed by a shift register of appropriate length. Each delay device delays the signal by a period corresponding to the chip interval or sample period used in the communication system. The input chip stream x(t) is applied to an input of the delay line 101.

The filter 100' also includes an N-sample integrator system, which encompasses the adder 103' and the actual integrator loop 105 formed by another adder 107 and a delay device 109. In this embodiment, the first (+) input of the adder 103' receives the inverse of the input x(t), for example via an inverter (not shown). As such, this input receives the inverse $-X_0$ of the current value $X_0$ of the input at time t=0. The other input of the adder 103' receives the $X_{16}$ sample. As a result of these connections, the inverter and the adder 103' essentially subtract the newest sample from the oldest sample preceding the current 16 samples, effectively reversing the sign of the input to the integrator loop.

The adder 103 supplies the result of this subtraction to the integration loop 105. The integration loop 105 again comprises the adder 107, the delay device 109 and the feedback loop connected from the output of the delay device 109 to the second input of the adder 107. The device 109 provides a delay of one sample interval. The integration loop 105 essentially adds the difference between the $X_{16}$ value and the $X_0$ value to the total value calculated during the previous sample period as represented by the output of the delay device 109.

The delay device 109 supplies the integration value to one positive input of an adder circuit 111'. The circuit 111' has a second positive input, which receives a compensation value Z' from a compensation calculation circuit 215'. The Y' output of the adder 111' represents the actual correlation value related to the degree of matching between the N-samples of the input x(t) and the actual spreading code sequence.

The current value of the input signal x(t) is $X_0$. The taps of the delay line 101 output 16 (N) delayed samples $X_1$ to $X_{16}$. In accord with the invention, subsets of the current N samples are applied to a series of selector control blocks, in this embodiment to the blocks 113' within the compensation calculation circuit 215'. Again, each block receives a subset consisting of four of the input samples. Thus, selector control block A ($113_0$') receives the samples $X_0$ to $X_3$. The selector control block B ($113_1$') receives the samples $X_4$ to $X_7$. Similarly, the selector control block C ($113_2$') receives the samples $X_8$ to $X_{11}$; and the selector control block D ($113_3$') receives the samples $X_{12}$ to $X_{15}$.

Each selector control block 113' also receives a subset of the values of the reference code sequence, specifically four values each, in the 16-chip example. Thus, selector control block A ($113_0$') receives the values $r_0$ to $r_3$. The selector control block B ($113_1$') receives the values $r_4$ to $r_7$. Similarly, the selector control block C ($113_2$') receives the values $r_8$ to $r_{11}$; and the selector control block D ($113_3$') receives the values $r_{12}$ to $r_{15}$.

The selector control blocks 113' preferably utilize programmable control gates, preferably in the form of selectors, to execute a gating function on the input samples and adders to accumulate the values from selected ones of the input samples. The specific selection and accumulation function is based on the subset of the reference code. In the illustrated embodiment, each selector block effectively gates specific sample values so that they pass through at positions in the input sequence that correspond to the non-identity (0) values in the reference sequence.

Figure 3B:
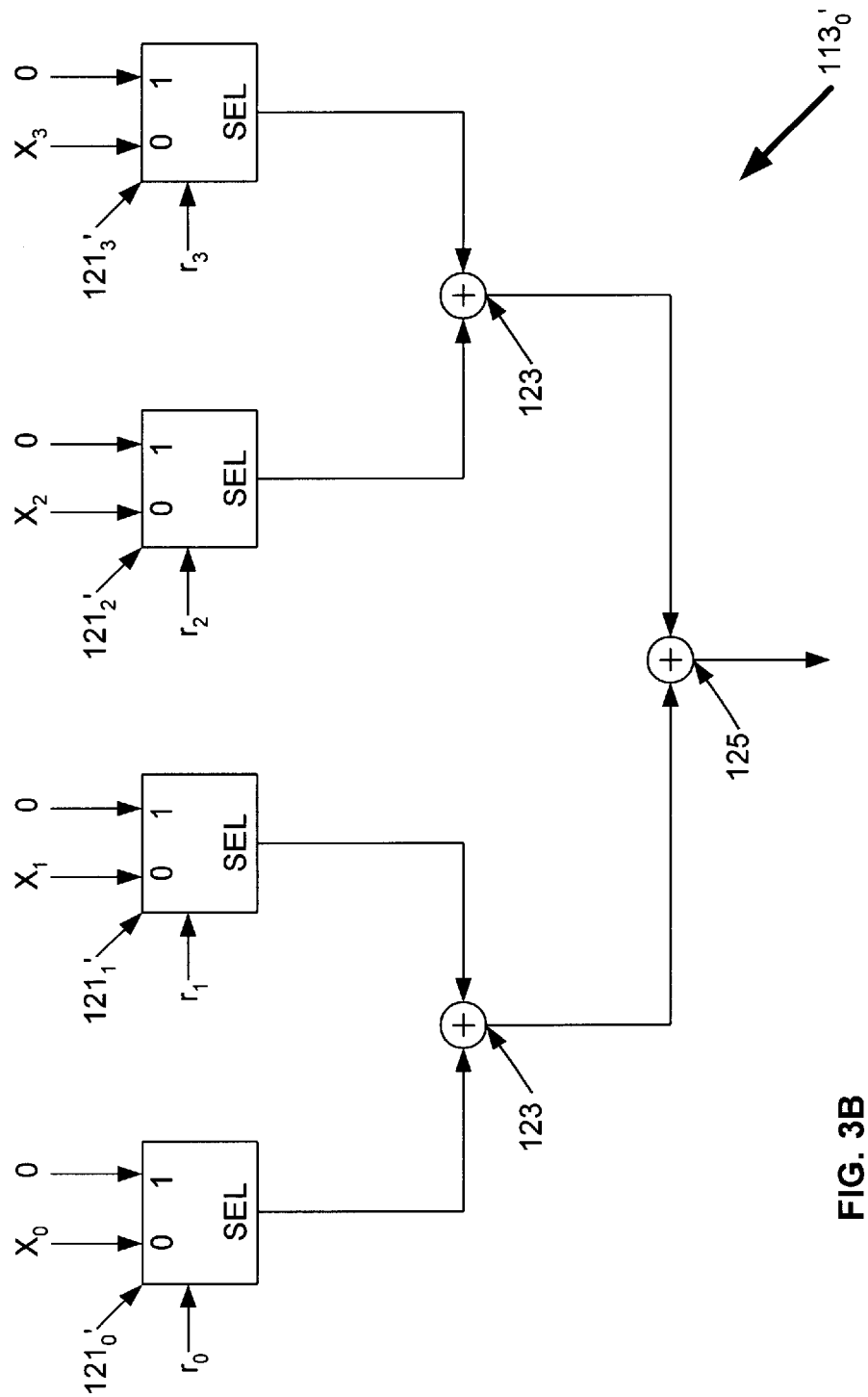
FIG. 3B is a functional block diagram of the selector blocks, specifically, a selector block for use in the inventive programmable matched filter of FIG. 2B.

Each selector block 113' sums such gated sample data, to form the respective data value. It may be helpful to consider the structure of one of the selector control blocks 113', as an example. FIG. 3B is a block diagram of the selector control block 1130'. In the current example, where selector control block $113_0'$ processes four input samples and four values from the reference sequence, the block comprises four selectors 121'. The control gates could comprise gate circuits of various types, but preferably each selector comprises a 1-output from 2-input selector, which is responsive to one control input.

In the preferred implementation, each selector 121' receives a null (0) value on its 1 input port. On its 0 input port, each selector 121' receives a respective sample value $X_1$, consisting of the +1 or −1 value at any given time (in the ideal case). As a control input, each selector 121' receives one of the $r_i$ values of the reference sequence. For example, the selector $121_0'$ receives the current input sample $X_0$ on its 0 input port and receives the $r_0$ value of the reference sequence on its control input. Similarly, the selector $121_1'$ receives the input sample $X_1$ (delayed from the preceding sample interval) on its 0 input port and receives the $r_1$ value of the reference sequence on its control input. In like fashion, the selector $121_2'$ receives the sample $X_2$ on its 0 input port and receives the $r_2$ value of the reference sequence on its control input, whereas the selector $121_3'$ receives the sample $X_3$ on its 0 input port and receives the $r_3$ value of the reference sequence on its control input.

The $r_i$ reference values may have a binary 0 or 1 value. Consequently, if a reference value is binary 0 (non-identity), the selector supplies the respective data value (+1 or −1) from the 0 input port to the output of the respective selector 121'. If the reference value is binary 1, the selector supplies the null value (0) from the 1 input port to the output of the respective selector 121'.

Adders 123 sum the outputs from pairs of the selectors 121'. An adder 125 in turn sums the output values from the adders 123. The data value output by the adder 125 represents the sum of the sample values corresponding to the respective non-identity value reference components.

To appreciate the operation of the selector control circuit $113_0'$, it may be helpful to again consider a specific numerical example. First, if the reference values were actually all 1s, each selector 121 would output a null (0) value. Such outputs would be summed, but the sum would still be 0, essentially meaning that no compensation is necessary.

Now assume for discussion purposes, that the $r_0$ to $r_3$ portion of the reference sequence alternates between values, for example the $r_0$ to $r_3$ values are 0, 1, 0, 1. In such a case, the selector $121_0'$ would output the $X_0$ sample value (current +1 or −1 value) because the reference is a 0 value. However, the selector $121_1'$ would output the null (0) value. Similarly, the selector $121_2'$ would output the +1 or −1 value of the $X_2$ sample value because the reference is a 0 value, whereas the selector $121_3'$ would output the null (0) value. The adders 123 and 125 would sum the four selector outputs, in this case to obtain the data value based on the total of the $X_0$ and $X_2$ samples.

The selector control block $113_0'$ operates in a similar manner for other variations of the sequence of values of the reference to sum the sample values for those reference samples that are 0 instead of 1. The other selector control blocks $113_1'$ to $113_3'$ operate in the same fashion as the block $113_0'$, to processes the respective subsets of sample values and reference values, to produce appropriate data values.

Returning to FIG. 2B, the programmable matched filter 100' includes a pair of adders 115. Each of the adders 115 sums a pair of the data output values from two of the selector control blocks 113'. An adder 117, in turn sums the values output by the adders 115, to form the first level compensation value C'. The value C' represents the sum of the samples at the current time, for those samples corresponding to non-identity values in a respective reference signal.

The filter 100' includes a doubler or multiplier 119. The multiplier 119 receives the total C' value output by adder 117. As explained above, the C' value was accumulated from data values output by the selector control blocks 113'. The multiplier 119 multiplies the first level compensation value C' by a factor of 2, to form the actual compensation value Z'. The multiplier 119 supplies the value to the adder 111', which adds the Z' value to the result of the integration of the input over the latest 16 sample intervals (from delay device 109), to produce the actual correlation value Y', in this embodiment.

The implementation of a single matched filter as in FIGS. 2A and 3A or as in FIGS. 2B and 3B provides programmability, through the use of the selectors 121 or 121'. Unlike the prior art programmable matched filter, the inventive filter does not require an inverter for one of the inputs of each of the selectors, although two inverters are needed to process other values (negative inputs to the adders 103, 103' and/or 111). Also, the filter of FIG. 2A or of FIG. 2B does include additional adders (103, 107, 111) as well as a delay device 109 and a multiplier 119. The net savings in number of circuit elements may be relatively small for a single filter processing a short code sequence (say 16-chips or less). However, the saving in numbers of inverters increases as the filter is enlarged to process longer code sequences (e.g. 64-chips or longer). The longer the code sequence, the greater the savings. Also, some of the computation circuitry may be shared when implementing a bank of such filters, such that the overall savings is multiplied by the number of possible code sequences that the bank processes in parallel.

Figure 4:
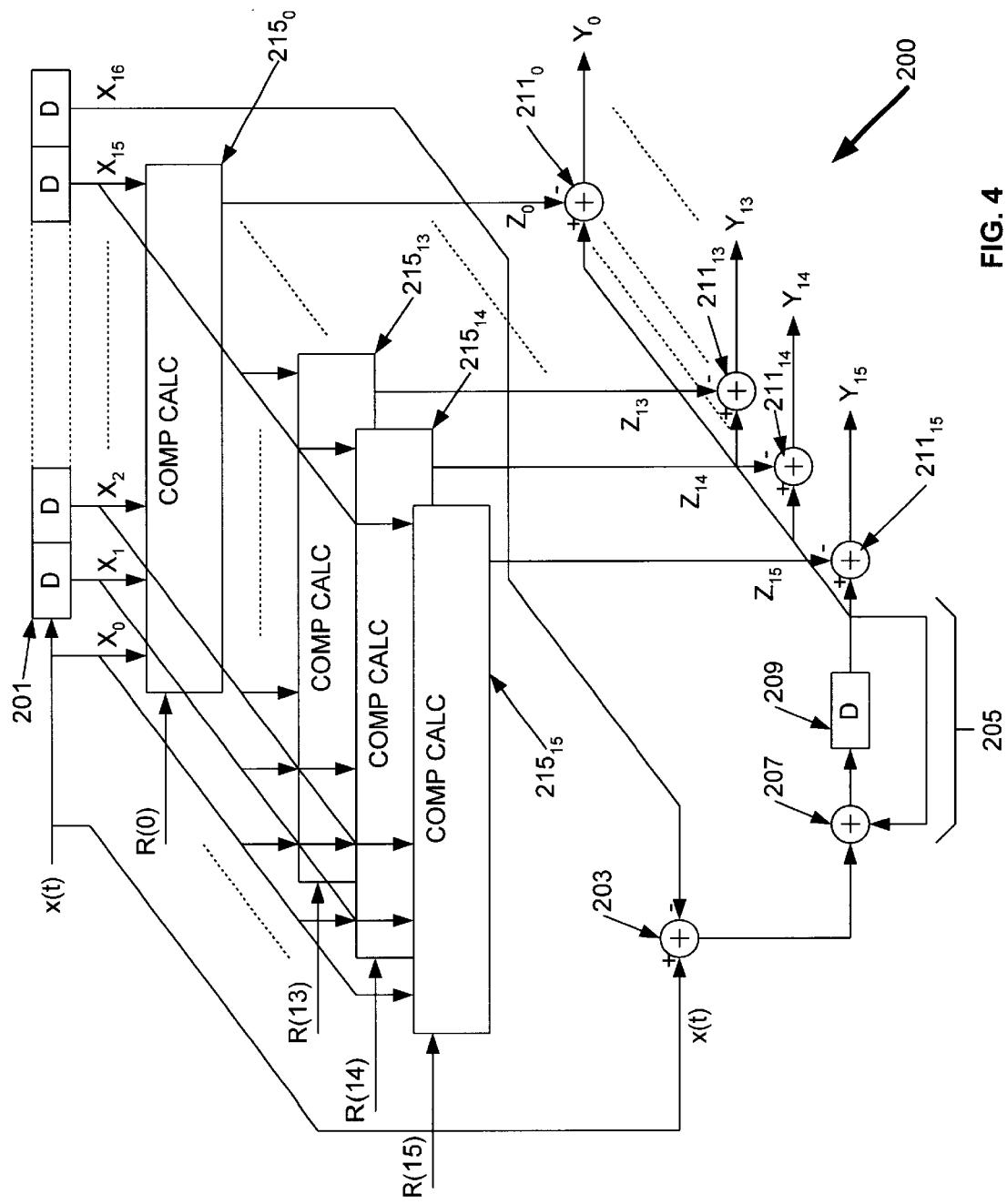
FIG. 4 a block diagram of a programmable matched filter bank embodying the inventive concepts, for use in a spread spectrum receiver such as the receiver in the communication system of FIG. 1.

As noted in the discussion of FIG. 1, a receiver for burst-mode high-rate communications in a spread-spectrum system will utilize at least one and often two or more matched filter banks. Because some of the computation circuitry is shared between filters in a bank, the invention is particularly useful in a filter bank for such a spread spectrum receiver. FIG. 4 shows an example of the inventive programmable matched filter in a filter bank implementation.

Assume again, for purposes of discussion, that code sequences used in the spread-spectrum communication system are 16 chips long, although the filter bank invention is easily adaptable to processing of codes of other lengths. In the example, the filter bank 200 includes a multi-tap delay line 201 comprising 16 delay devices, for example formed by a shift register of appropriate length. The input chip stream x(t) is applied to an input of the delay line 201. The delay line 201 is the first of several common elements, that is to say shared for processing in regard to a plurality of reference codes.

The filter bank 200 also includes an integrator, which also is a shared element. The integrator includes an adder 203 and an integration circuit or loop, 205.

The first input of the adder 203 connects to the input x(t). As such, this input receives the current value $X_0$ of the input at time t=0. The other input of the adder 203 receives a negative or inverse of the oldest sample preceding the most recent N samples, that is to say of the $X_{16}$ sample in our 16-chip example. The drawing omits the actual inverter between the last tap of the delay line 201 and the second input to the adder 203, for simplicity of illustration. The adder 203 subtracts the oldest sample ($X_{16}$) preceding the most recent 16 samples, from the latest $X_0$ sample value.

The adder 203 supplies the result of this subtraction to an integration circuit 205, formed by an adder 207, a delay device 209 and a feedback loop connected from the output of the delay device 209 to the second input of the adder 207. The integration loop 205 adds the difference between the $X_0$ value and the $X_{16}$ value to the total value calculated during the previous sample period.

In the filter bank implementation, however, the adder 203 and the components 207, 209 of the integrator are shared elements. Only one set of these components are needed to determine the integration of the input samples, for all of the correlation processes with respect to a plurality of reference codes. The delay device 209 therefore supplies the integration value to the positive input of each of a plurality of adder circuits 211. Each adder circuit 211 has a negative or inverse input, which receives a compensation value Z (inverter not shown for simplicity of illustration) derived from processing the input samples in relation to a different reference code. The respective adder and inverter (not shown) form a correlation calculation circuit to modify the integration value by the respective compensation value. The Y output of each adder 211 therefore represents the actual correlation value related to the degree of matching between the input x(t) to the respective spreading code sequence. Those skilled in the art with recognize that a variety of other computation or logic circuits may be used to implement appropriate correlation calculation circuits.

In the illustrated example, it is assumed that there are 16 possible spreading codes that may be utilized in the particular spread spectrum system. Accordingly, there are sixteen reference code sequences R(0) to R(15) corresponding to the possible spreading codes. The filter bank therefore uses 16 adders $211_0$ to $211_{15}$ to produce the respective 16 correlation values $Y_0$ to $Y_{15}$. The current value of each of the compensation components $Z_0$ to $Z_{15}$ is calculated through a modified matching operation performed by a respective compensation calculation circuit $215_0$ to $215_{15}$.

For this purpose, each compensation calculation circuit 215 receives the current sample $X_0$ from the input line and receives the $X_1$ to $X_{15}$ samples from the respective taps of the delay line 201. Each compensation calculation circuit 215 also receives a different one of the reference sequences (R(0) to R(15)). Each of the reference sequences comprises a respective distinct series or sequences of 0, 1 binary values, similar to the sequence $r_0$ to $r_{15}$ in the earlier example. In the 16-chip long code example, each compensation calculation circuit 215 preferably comprises the four selector control circuits 113, the pair of adders 115, the adder 117 and the multiplier 119, discussed above relative to FIGS. 2 and 3. Consequently, each circuit $215_0$ to $215_{15}$ operates in the same manner as discussed above relative to the earlier example, to produce a respective compensation value of $Z_0$ to $Z_{15}$ and supply that value to the respective adder $211_0$ to $211_{15}$, to produce the respective correlation value $Y_0$ to $Y_{15}$.

The embodiment of FIG. 4 is implemented as an extension of the filter design of FIG. 2A. It should be apparent, as an alternative, that the bank of FIG. 4 can also be implemented by use of the filter design of FIG. 2B. In such an embodiment of the filter bank, the signs on the inputs of the adder 203 would be reversed (similar to FIG. 2B). Also, each of the correlation calculation circuits would comprise only the respective adder $211_0$, $211_1$, . . . or $211_{15}$ (without an inverter). As such, each respective $Y_0$, $Y_1$, . . . $Y_{15}$ correlation value would equal the sum of the respective $Z_0$, $Z_1$, . . . $Z_{15}$ compensation value and the common integration value, in a manner analogous to the operation of the one filter in FIG. 2B.

Those skilled in the art will recognize that the concepts involved in the present inventions may be modified and are readily adaptable to other applications. As a first example, the concept of combining an integrator with a compensation circuit to perform the matched filter could utilize a set of hard-wired connections to implement the summations for the compensation vector, instead of using the programmable selectors. Examples of such implementations appear in FIGS. 5A and 5B.

Figure 5A:
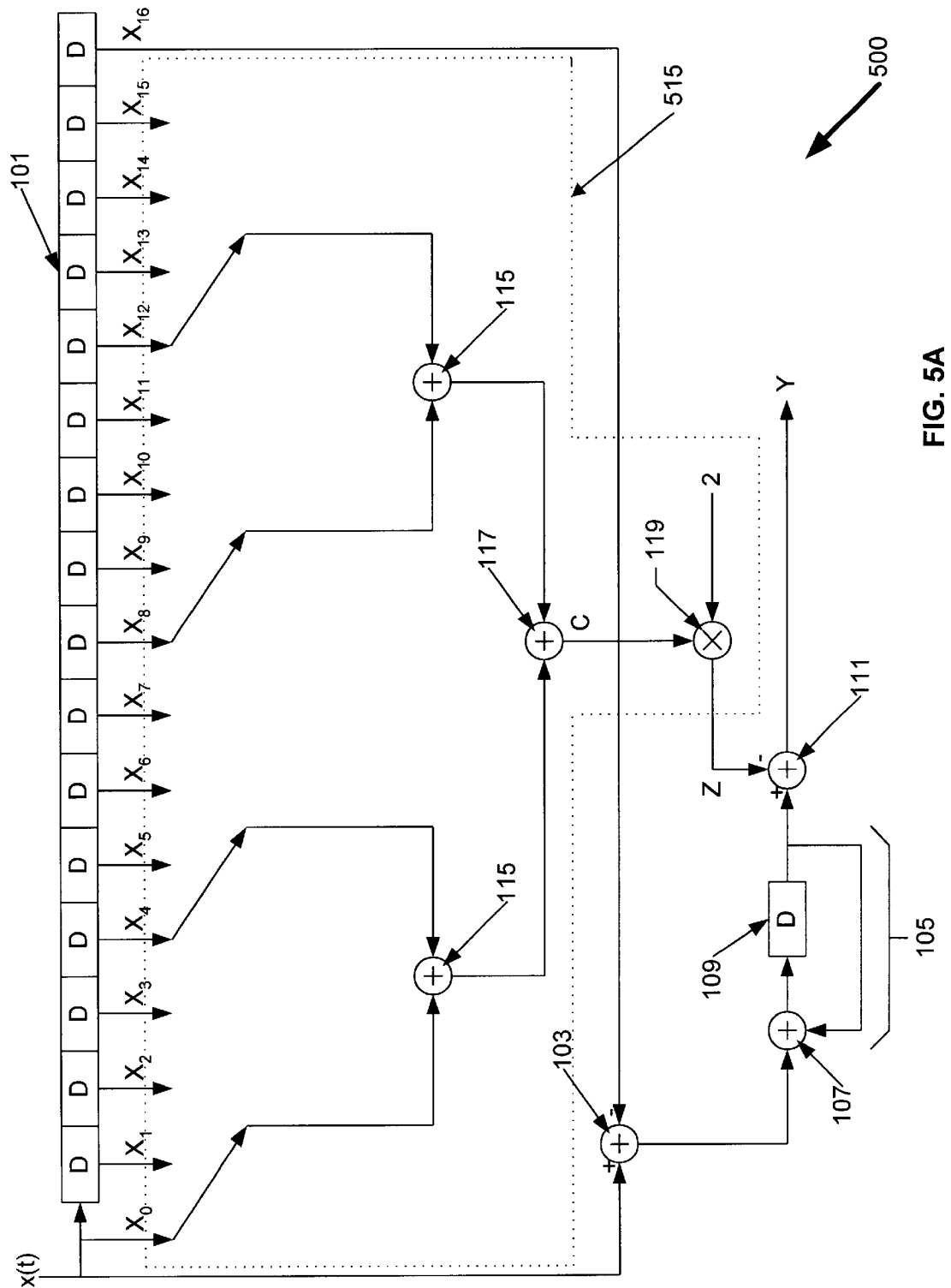
FIG. 5A is a functional block diagram of a hard-wired matched filter, in accord with another embodiment of the present invention.

FIG. 5A illustrates an embodiment wherein the 1s in the reference code sequence are the minority, as illustrated in the following example, 1000100010001000 (i.e., $r_0=1$, $r_1=0$, $r_2=0$. . . ). Essentially, the reference code is a fixed sequence, therefore the selector blocks have been replaced with hard-wired connections corresponding to the identity (1) values in the particular code. Otherwise, the elements 101, 103, 105, 109, 111, 115, 117 and 119 function exactly as in the embodiment of FIG. 2A, albeit to determine the correlation of the input to the fixed reference code 1000100010001000. A different set of $X_i$ values would be connected to the adders 115, for a different fixed reference code.

Figure 5B:
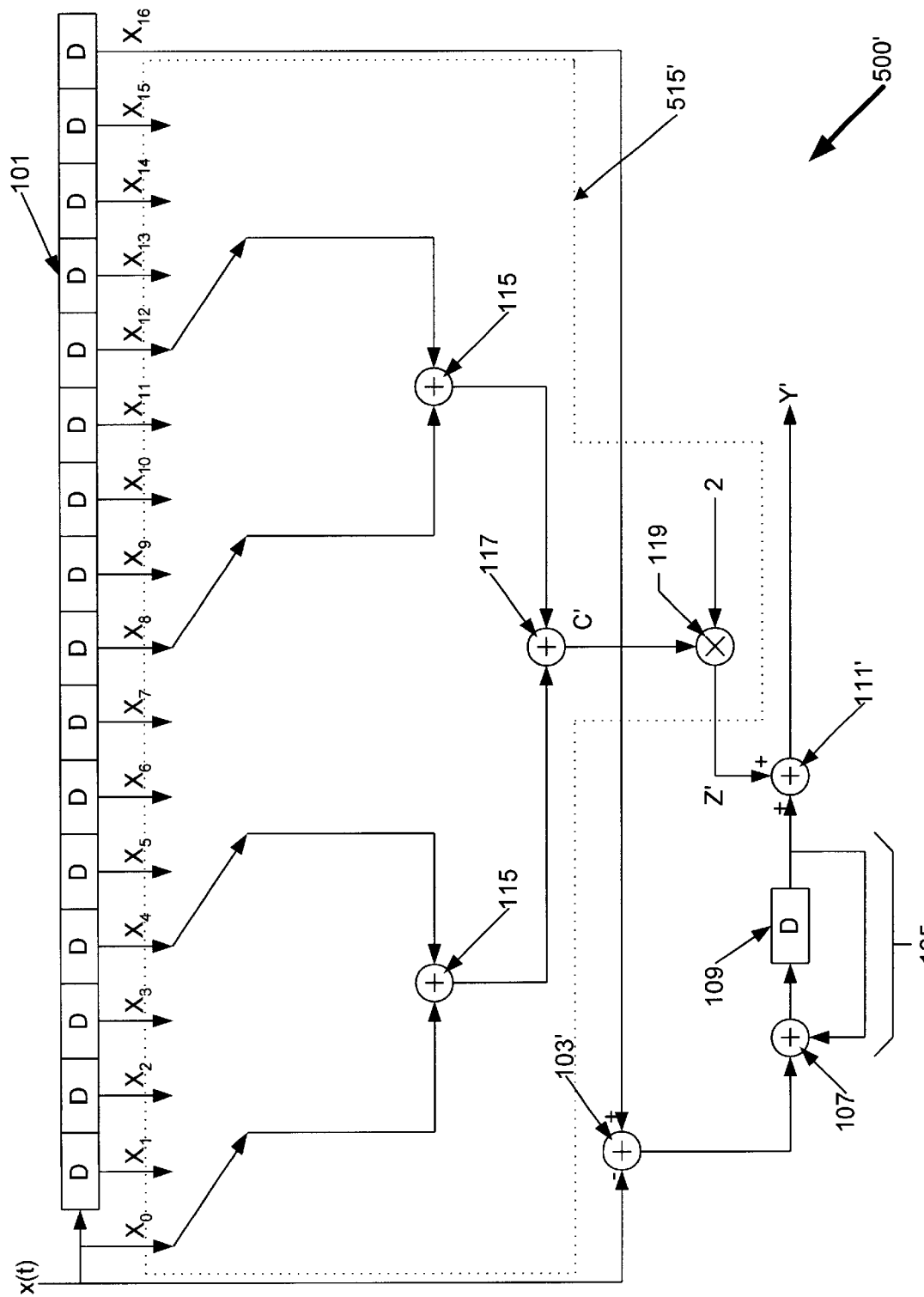
FIG. 5B functional block diagram of a hard-wired matched filter, in accord with a still further embodiment of the present invention.

FIG. 5B illustrates an embodiment wherein the 0s in the reference code sequence are the minority, as illustrated in the following example, 0111011101110111 (i.e., $r_0=0$, $r_1=1$, $r_2=1$.). Again, the reference code is a fixed sequence, and the selector blocks have been replaced with hardwired connections corresponding to the non-identity (0) values in the particular code. In this case, the elements 101, 103', 105, 109, 111', 115, 117 and 119 function exactly as in the embodiment of FIG. 2B, albeit to determine the correlation of the input to the fixed reference code 0111011101110111. A different set of $X_i$ values would be connected to the adders 115, for a different fixed reference code.

Similar hardwired embodiments can be constructed for any fixed code sequence of a given length, e.g. 16 chips in the examples of FIGS. 5A and 5B. The only difference from the illustrated implementations would be the particular sample lines that connect from the input and/or the delay taps to the adders. Also, the embodiments of FIGS. 5A and 5B are readily adaptable to implement filter banks, in much the same way that the filter of FIG. 2A is expanded to become the filter bank of FIG. 4.

As noted, the concepts involved in the present inventions may be modified and are readily adaptable to other applications. For example, the 16-chip implementations are simple examples, discussed and shown for convenience. The inventive matched filters and matched filter banks can be readily expanded to process longer spreading code sequences and/or larger numbers of different spreading code sequences. The spreading codes, for example, may be orthogonal or substantially orthogonal codes. Alternatively, the spreading codes and reference sequences may be pseudo-random (PN) sequences. Furthermore, although the above embodiments are implemented in hardware, those skilled in the art will recognize that a processor device programmed with appropriate software could perform many or all of the calculations/computations.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. A programmable matched filter for processing a received spread-spectrum signal, to determine the likelihood that the received spread-spectrum signal was spread with a predetermined spreading code sequence, comprising:

an integrator responsive to a chip stream of samples derived from the received spread-spectrum signal, for integrating a predetermined number of most recent samples from the chip stream to obtain an integration value;

a plurality of control gates corresponding in number to the predetermined number of most recent samples, each of the control gates receiving a respective one of the samples at an input port and receiving a respective value of a reference code sequence comprising the predetermined spreading code sequence at a control port such that the control gate outputs a value of the respective sample if the received reference value bears a predetermined relationship to an identity value;

at least one adder for summing the values output from the control gates to form a compensation value; and a circuit coupled to the at least one adder and to the integrator to modify the integration value by the compensation value.

2. A programmable matched filter as in claim 1, wherein the predetermined relationship is that a respective received reference value equals the identity value.

3. A programmable matched filter as in claim 2, wherein the circuit comprises a multiplier for multiplying an output from the at least one adder by a factor of 2 and a circuit for subtracting an output of the multiplier from the integration value.

4. A programmable matched filter as in claim 1, wherein the predetermined relationship is that a respective received reference value is not the identity value.

5. A programmable matched filter as in claim 4, wherein the circuit comprises a multiplier for multiplying an output from the at least one adder by a factor of 2 and a circuit for adding an output of the multiplier to the integration value.

6. A programmable matched filter as in claim 1, further comprising a multi-tap delay line coupled to receive the chip stream and coupled to supply the predetermined number of most recent samples via the taps to respective ones of the control gates, the delay line also supplying a preceding sample value for an interval immediately preceding the predetermined number of most recent samples for subtraction by the integrator value.

7. A programmable matched filter as in claim 1, wherein the integrator comprises:

a circuit for subtracting a sample value for an interval immediately preceding the predetermined number of most recent samples from a most current sample from the chip stream; and an adder and a delay device connected in a feedback loop, for adding an output of the circuit for subtracting to a previously accumulated total.

8. A programmable matched filter as in claim 1, wherein the integrator comprises:

a circuit for subtracting a most current sample from the chip stream from a sample value for V an interval immediately preceding the predetermined number of most recent samples; and an adder and a delay device connected in a feedback loop, for adding an output of the circuit for subtracting to a previously accumulated total.

9. A programmable matched filter as in claim 1, wherein each of the control gates comprises a selector circuit for selectively outputting a value of a respective sample as a function of a respective value of the reference code.

10. A programmable matched filter for processing a received spread-spectrum signal, to determine the likelihood that the received spread-spectrum signal was spread with a predetermined spreading code sequence, comprising:

an integrator responsive to a chip stream of samples derived from the received spread-spectrum signal, for integrating a predetermined number of most recent samples from the chip stream to obtain an integration value;

a plurality of programmable selector blocks, each of the selector blocks receiving a subset of the most recent samples and a subset of values of a reference code sequence comprising the predetermined spreading code sequence for outputting a data value derived from samples corresponding in position to any values bearing a predetermined relationship to identity values contained in the subset of values of the reference code sequence;

computation circuitry coupled to receive the data values from the programmable selector blocks for deriving a compensation value; and a circuit for using the compensation value to modify the integration value, to obtain a value of correlation between the predetermined number of most recent samples and the reference code sequence.

11. A programmable matched filter as in claim 10, wherein each programmable selector block comprises:

a plurality of control gates, each of the control gates receiving a respective one of the samples from a subset of the most recent samples at an input port and receiving a respective value of the reference code sequence at a control port such that the control gate outputs a value of the respective sample if the received reference value bears the predetermined relationship with respect to an identity value; and at least one adder for summing the values output from the control gates to form a respective one of the data values.

12. A programmable matched filter as in claim 11, wherein each of the control gates comprises a two-input selector circuit having a control port receiving a respective value of the reference code, one input being coupled to receive the respective sample and the other input being coupled to receive a null value.

13. A programmable matched filter as in claim 12, wherein the predetermined relationship is that a respective received reference value equals an identity value.

14. A programmable matched filter as in claim 12, wherein the predetermined relationship is that a respective received reference value is not an identity value.

15. A programmable matched filter as in claim 10, wherein the computation circuitry comprises at least one adder for summing the respective data values from the programmable selector blocks.

16. A programmable matched filter as in claim 15, wherein the computation circuitry further comprises a multiplier coupled to an output of the at least one adder, for multiplying the sum of the respective data values by a predetermined factor, to form the compensation value.

17. A programmable matched filter bank, for use in a spread spectrum receiver to process a received spread-spectrum signal to determine the likelihood that the received spread-spectrum signal was spread with each of a plurality of predetermined spreading code sequences, comprising:

an integrator responsive to a chip stream of samples derived from the received spread-spectrum signal, for integrating a predetermined number of most recent samples from the chip stream to obtain an integration value;

a plurality of compensation calculation circuits, each receiving a respective one of a corresponding plurality of reference code sequences relating to a spreading code sequence, each of the compensation calculation circuits comprising:

(a) a plurality of selectors corresponding in number to the predetermined number of most recent samples, each of the selectors receiving a respective one of the samples at an input port and receiving one of a plurality of values of the respective reference code sequence at a control port such that the selector outputs a value of the respective sample if the value received on its control port bears a predetermined relationship to an identity value, and (b) at least one adder for summing the values output from the selectors to form a respective compensation value; and a plurality of respective correlation calculation circuits, each respective correlation calculation circuit for modifying the integration value as a function of the respective compensation value output by one of the compensation calculation circuits, to obtain a value of correlation between the predetermined number of most recent samples and the respective reference code sequence.

18. A programmable matched filter bank as in claim 17, wherein each of the compensation calculation circuits further comprises a multiplier for multiplying an output from the at least one adder by a factor of 2 and supplying the results to a respective one of the one of the correlation calculation circuits.

19. A programmable matched filter bank as in claim 17, further comprising a multi-tap delay line, coupled to receive the chip stream and coupled to supply the predetermined number of most recent samples to respective ones of the selectors in each of the compensation calculation circuits, the delay line also being coupled to supply a preceding sample value for an interval immediately preceding the predetermined number of most recent samples for subtraction by the integrator.

20. A programmable matched filter bank as in claim 19, wherein the integrator comprises:

a circuit for subtracting the sample value for the interval immediately preceding the predetermined number of most recent samples from a current sample from the chip stream; and an adder and a delay device connected in a feedback loop, for adding a previously accumulated total for the integration value to an output of the circuit for subtracting.

21. A programmable matched filter bank, for use in a spread spectrum receiver to process a received spread-spectrum signal to determine the likelihood that the received spread-spectrum signal was spread with each of a plurality of predetermined spreading code sequences, comprising:

an integrator responsive to a chip stream of samples derived from the received spread-spectrum signal, for integrating a predetermined number of most recent samples from the chip stream to obtain an integration value;

a plurality of compensation calculation circuits, each receiving a respective one of a corresponding plurality of reference code sequences relating to a spreading code sequence, each of the compensation calculation circuits comprising:

(a) a plurality of programmable selector blocks, each of the selector blocks receiving a subset of the most recent samples and receiving a subset of values of the respective one reference code sequence, for outputting a data value derived from samples corresponding in sequential position to values having a predetermined relationship to an identity value contained in the subset of values of the respective one reference code sequence, and (b) computation circuitry coupled to receive the data values from the programmable selector blocks for deriving a respective compensation value; and a plurality of respective correlation calculation circuits, each respective correlation calculation circuit for modifying the integration value as a function of the respective compensation value output by one of the compensation calculation circuits, to obtain a value of correlation between the predetermined number of most recent samples and the respective reference code sequence.

22. A programmable matched filter bank as in claim 21, wherein each programmable selector block comprises:

a plurality of selectors, each of the selectors receiving a respective one of the samples from a subset of the most recent samples at an input port and receiving a reference value at a control port such that the selector outputs a value of the respective sample if the value at its control port is not an identity value; and at least one adder for summing the values output from the selectors to form a respective one of the data values.

23. A programmable matched filter bank as in claim 21, wherein each programmable selector block comprises:

a plurality of selectors, each of the selectors receiving a respective one of the samples from a subset of the most recent samples at an input port and receiving a reference value at a control port such that the selector outputs a value of the respective sample if the value at its control port is an identity value; and at least one adder for summing the values output from the selectors to form a respective one of the data values.

24. A programmable matched filter bank as in claim 21, wherein the computation circuitry comprises at least one adder for summing the respective data values from the programmable selector blocks.

25. A programmable matched filter bank as in claim 24, wherein the computation circuitry further comprises a multiplier coupled to an output of the at least one adder, for multiplying the sum of the respective data values by a predetermined factor, to form the respective compensation value.

26. A matched filter for processing a received spread-spectrum signal, to determine the likelihood that the received spread-spectrum signal was spread with a predetermined spreading code sequence, comprising:

an integrator responsive to a chip stream of samples derived from the received spread-spectrum signal, for integrating a predetermined number of most recent samples from the chip stream to obtain an integration value; and means, receiving the predetermined number of the most recent samples, for deriving a compensation value as a function of a reference code sequence and modifying the integration value by the compensation value, to obtain a value of correlation between the predetermined number of most recent samples and the reference code sequence.

27. A matched filter bank, for use in a spread spectrum receiver to process a received spread-spectrum signal to determine the likelihood that the received spread-spectrum signal was spread with each of a plurality of predetermined spreading code sequences, comprising:

an integrator responsive to a chip stream of samples derived from the received spread-spectrum signal, for integrating a predetermined number of most recent samples from the chip stream to obtain an integration value; and a plurality of compensation means, each compensation means receiving the predetermined number of the most recent samples, wherein:

said each compensation means is for deriving a respective compensation value as a function of a respective one of a plurality of reference code sequences each relating to a spreading code sequence, and said each compensation means is for modifying the integration value by the respective compensation value, to obtain a value of correlation between the predetermined number of most recent samples and the respective reference code sequence,.

28. A method for matched filtering of a received spread-spectrum signal to determine the likelihood that the received spread-spectrum signal was spread with a predetermined spreading code sequence, comprising:

integrating a predetermined number of most recent samples derived from the received spread-spectrum signal to obtain an integration value;

processing the predetermined number of most recent samples in relation to a reference code sequence comprising the predetermined spreading code sequence, to determine a compensation value based on values within the reference code sequence having a predetermined relationship to an identity value; and adjusting the integration value based on the compensation value, to determine a value of correlation between the predetermined number of most recent samples and the reference code sequence.

29. A method as in claim 28, wherein the processing step comprises:

for each respective value of the reference code sequence, selecting a null value if the respective value of the reference code sequence has an identity value, and selecting a respective value of the samples derived from the received spread-spectrum signal if the respective value of the reference code sequence has a non-identity value; and processing a sum of the selected values to form the compensation value.

30. A method as in claim 28, wherein the processing step comprises:

for each respective value of the reference code sequence, selecting a null value if the respective value of the reference code sequence has a non-identity value, and selecting a respective value of the samples derived from the received spread-spectrum signal if the respective value of the reference code sequence has an identity value; and processing a sum of the selected values to form the compensation value.

31. A matched filter for processing a received spread-spectrum signal, to determine the likelihood that the received spread-spectrum signal was spread with a predetermined spreading code sequence, comprising:

an integrator responsive to a chip stream of samples from the received spread-spectrum signal, for integrating a predetermined number of most recent samples from the chip stream to obtain an integration value;

a plurality of hard-wired connections to receive a plurality of the most recent samples, each of the hard-wired connections receiving a respective one of the samples at an input corresponding to a respective value of a reference code sequence comprising the predetermined spreading code sequence, wherein each respective value bears a predetermined relationship to an identity value;

at least one adder for summing the values from the hard-wired connections to form a compensation value; and a circuit coupled to the at least one adder and to the integrator to modify the integration value by the compensation value.

32. A matched filter as in claim 31, wherein the hardwired connections receive samples in a sequence of the predetermined number of most recent samples corresponding to non-identity values in the reference code sequence.

33. A matched filter as in claim 32, wherein the circuit comprises a multiplier for multiplying an output from the at least one adder by a factor of 2 and a circuit for adding an output value from the multiplier to the integration value.

34. A matched filter as in claim 33, further comprising a multi-tap delay line coupled to receive the chip stream and coupled to supply the plurality of the most recent samples to respective ones of the hard-wired connections, the delay line also supplying a preceding sample value for an interval immediately preceding the predetermined number of most recent samples to a circuit for subtracting the most recent sample from the sample value for the immediately preceding interval and providing the result of this subtraction as an input to the integrator.

35. A matched filter as in claim 31, wherein the hardwired connections receive samples in a sequence of the predetermined number of most recent samples corresponding to identity values in the reference code sequence.

36. A matched filter as in claim 35, wherein the circuit comprises a multiplier for multiplying an output from the at least one adder by a factor of 2 and a circuit for subtracting an output value from the multiplier from the integration value.

37. A matched filter as in claim 36, further comprising a multi-tap delay line coupled to receive the chip stream and coupled to supply the plurality of the most recent samples to respective ones of the hard-wired connections, the delay line also supplying a preceding sample value for an interval immediately preceding the predetermined number of most recent samples to a circuit for subtracting the sample value for the immediately preceding interval from the most recent sample and providing the result of this subtraction as an input to the integrator.

* * * * *